(12) United States Patent
Wagner et al.

(10) Patent No.: US 9,030,138 B2
(45) Date of Patent: May 12, 2015

(54) METHOD FOR DRIVING AN ELECTRIC MOTOR

(75) Inventors: Thomas Wagner, Reutlingen (DE);
Dieter Thoss, Schwieberdingen (DE);
Andreas Merker, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 13/637,516

(22) PCT Filed: Mar. 17, 2011

(86) PCT No.: PCT/EP2011/054050
§ 371 (c)(1),
(2), (4) Date: Dec. 10, 2012

(87) PCT Pub. No.: WO2011/120816
PCT Pub. Date: Oct. 6, 2011

(65) Prior Publication Data
US 2013/0088178 A1   Apr. 11, 2013

(30) Foreign Application Priority Data
Mar. 31, 2010  (DE) .......................... 10 2010 003 527

(51) Int. Cl.
*H03K 5/00*    (2006.01)
*H02P 6/00*    (2006.01)
*H02P 27/08*   (2006.01)
*H02P 6/14*    (2006.01)

(52) U.S. Cl.
CPC ................ *H02P 6/001* (2013.01); *H02P 6/002* (2013.01); *H02P 27/08* (2013.01); *H02P 6/14* (2013.01); *Y10S 388/909* (2013.01)

(58) Field of Classification Search
USPC .............. 318/400.01, 400.14, 400.15, 400.1,
318/700, 701, 721, 799, 432, 599, 811, 565,
318/400.4, 400.13, 400.32, 400.34;
388/811, 819, 909
See application file for complete search history.

(56) References Cited

U.S. PATENT DOCUMENTS

| | | | |
|---|---|---|---|
| 5,426,355 A * | 6/1995 | Zweighaft ...................... | 318/364 |
| 5,892,347 A * | 4/1999 | Zweighaft et al. ............ | 318/590 |
| 6,137,251 A | 10/2000 | Huang et al. | |
| 7,898,211 B2 * | 3/2011 | Takeuchi ...................... | 318/811 |
| 2001/0011847 A1 * | 8/2001 | Laurent ...................... | 310/67 R |
| 2005/0212472 A1 * | 9/2005 | Chapman et al. ............ | 318/439 |

FOREIGN PATENT DOCUMENTS

| | | |
|---|---|---|
| EP | 0 316 006 | 5/1989 |
| JP | 60 046789 | 3/1985 |
| JP | 61 018364 | 1/1986 |
| JP | 10 507 66 | 2/1989 |
| JP | 11 187 692 | 7/1999 |

(Continued)

OTHER PUBLICATIONS

International Search Report for PCT/EP2011/054050, dated May 31, 2012.

*Primary Examiner* — Anthony M Paul
(74) *Attorney, Agent, or Firm* — Kenyon & Kenyon LLP

(57) ABSTRACT

A circuit configuration for driving an electric motor includes a signal evaluation module, which stores a number of output patterns. An input pattern is specified, and as a function of the input pattern, one of the output patterns is output, by which the electric motor is driven.

19 Claims, 2 Drawing Sheets

(56) References Cited   * cited by examiner

FOREIGN PATENT DOCUMENTS

JP      2008-86180      4/2008
WO    WO 2009/110206   9/2009

METHOD FOR DRIVING AN ELECTRIC MOTOR

BACKGROUND OF THE INVENTION

1. Field of the Invention

The present invention relates to a method for driving an electric motor and a circuit configuration for carrying out the method.

2. Description of the Related Art

In automotive technology, electric motors for various units, such as fuel pumps or oil pumps are used ever more frequently. So-called BLDC motors (brushless DC motors) are usually used for these drive systems. These motors are robust, and operate almost free of wear.

Different variants exist of BLDC motors, thus, for instance, motors are known having a so-called block commutation drive. In this instance, a 3-phase alternating voltage is required for driving the motor. It should be noted that, in today's systems, either an additional drive component is required or special timer units are provided in the microcontroller.

BRIEF SUMMARY OF THE INVENTION

The driving of the electric motors uses the available input and output modules of timer unit modules. Thus a timer unit input module may be used, which is usually there to record and filter input signals, a timer unit output module, which is provided for outputting PWM signals via a plurality of output channels, and a signal evaluation module, which is provided for evaluating sensor inputs, as from Hall sensors, for example. The signal evaluation module, together with the timer unit output module, supports the driving of electric motors, such as BLDC motors.

Furthermore, it should be noted that a large part of the required hardware is not only usable for the BLDC operation, but is also able to be used for other functions, when no BLDC operation is taking place, such as the PWM output or the measuring of input signals.

Thus the circuit configuration introduced is configurable in a flexible manner. At the input, a pattern from Hall sensors may be present. The output may, in turn, be used for activating motor amplifiers. In addition, the entire configuration may be changed during the running time, to switch over, for example, between two motor operating modes.

The circuit configuration described enables the operation of a BLDC motor, without a software intervention being required. There is present a closed circle from the recording of the sensor data to the generation of the output signals, i.e. from input to output.

The time at which a new driving pattern is applied to the outputs may be configured freely. Either an update may take place synchronously to changes of the input signals (sensor signals) or asynchronously to the input signals but synchronously to events at the output signals, as for instance in the case of a rising or falling side at the output. The commutation, that is, the commutating of the next task, may be performed synchronously with the input signal.

In the circuit configuration introduced, which is used, for instance, to drive BLDC motors, the output pattern or the output parameters are stored in a table in the signal evaluation module, and is/are able to be configured flexibly at any time by a central processing unit (CPU). In particular, the circuit configuration, at least in some of the embodiments, is equipped with PWM generators which may also be used for other PWM functions, especially if the BLDC functionality is not activated.

Additional advantages and developments of the present invention result from the specification and the appended figures.

It is understood that the features mentioned above and the features yet to be described below may be used not only in the combination given in each case but also in other combinations or individually, without departing from the scope of the present invention.

DETAILED DESCRIPTION OF THE INVENTION

Figure 1:
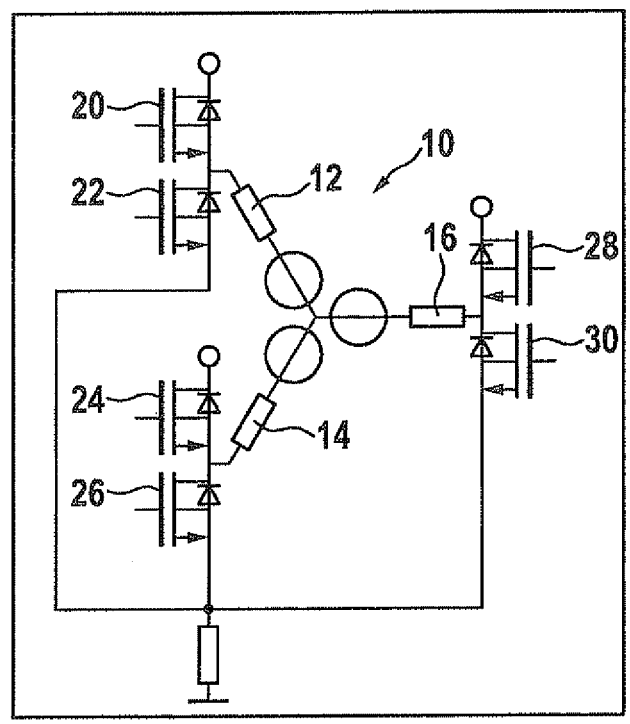
FIG. 1 in a block diagram shows the driving of an electric motor.

In FIG. 1 a block diagram clarifies the driving of an electric motor, which is indicated as a whole by reference numeral 10. It includes three phases, namely, a phase U 12, a phase V 14 and a phase W 16. For the driving, a transistor HU (high, phase U) 20, a transistor LU (low, phase U) 22, a transistor HV 24, a transistor LV 26, a transistor HW 28 and a transistor LW 30 are provided.

Figure 2:
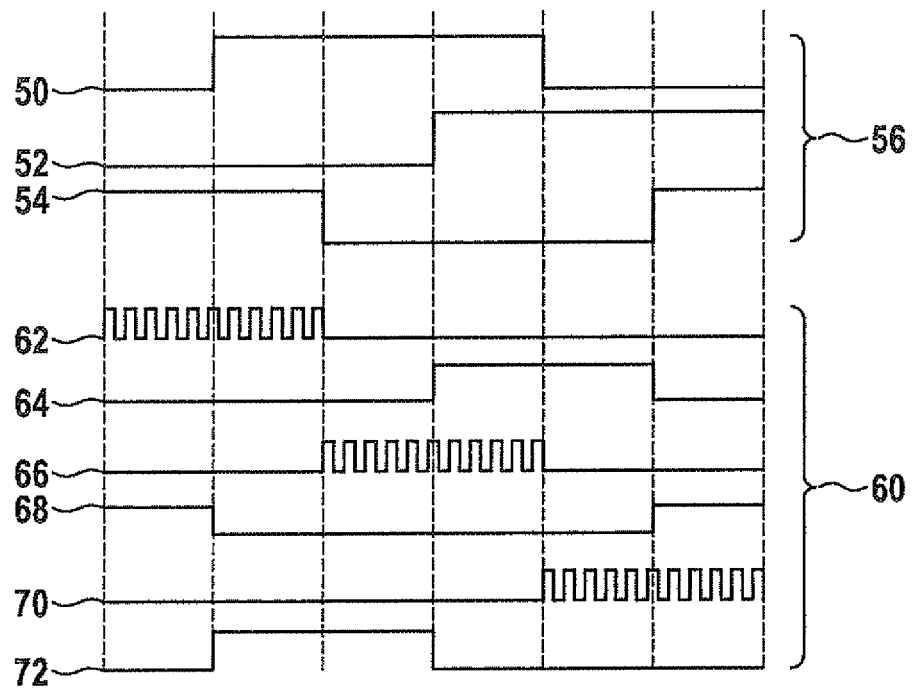
FIG. 2 shows signal curves during the driving of the electric motor.

These signal curves are shown in FIG. 2. A first curve 50 shows a first input signal, for instance, from a Hall sensor, at the timer unit input module, a second curve 52 shows a second input signal at the timer unit input module, and a third curve 54 shows a third input signal at the timer unit input module. These input signals 50, 52 and 54 represent an input pattern 56.

Moreover, an output pattern 60 at the timer unit output module is shown, namely a first output signal 62, a second output signal 64, a third output signal 66, a fourth output signal 68, a fifth output signal 70, and a sixth output signal 72.

Figure 3:
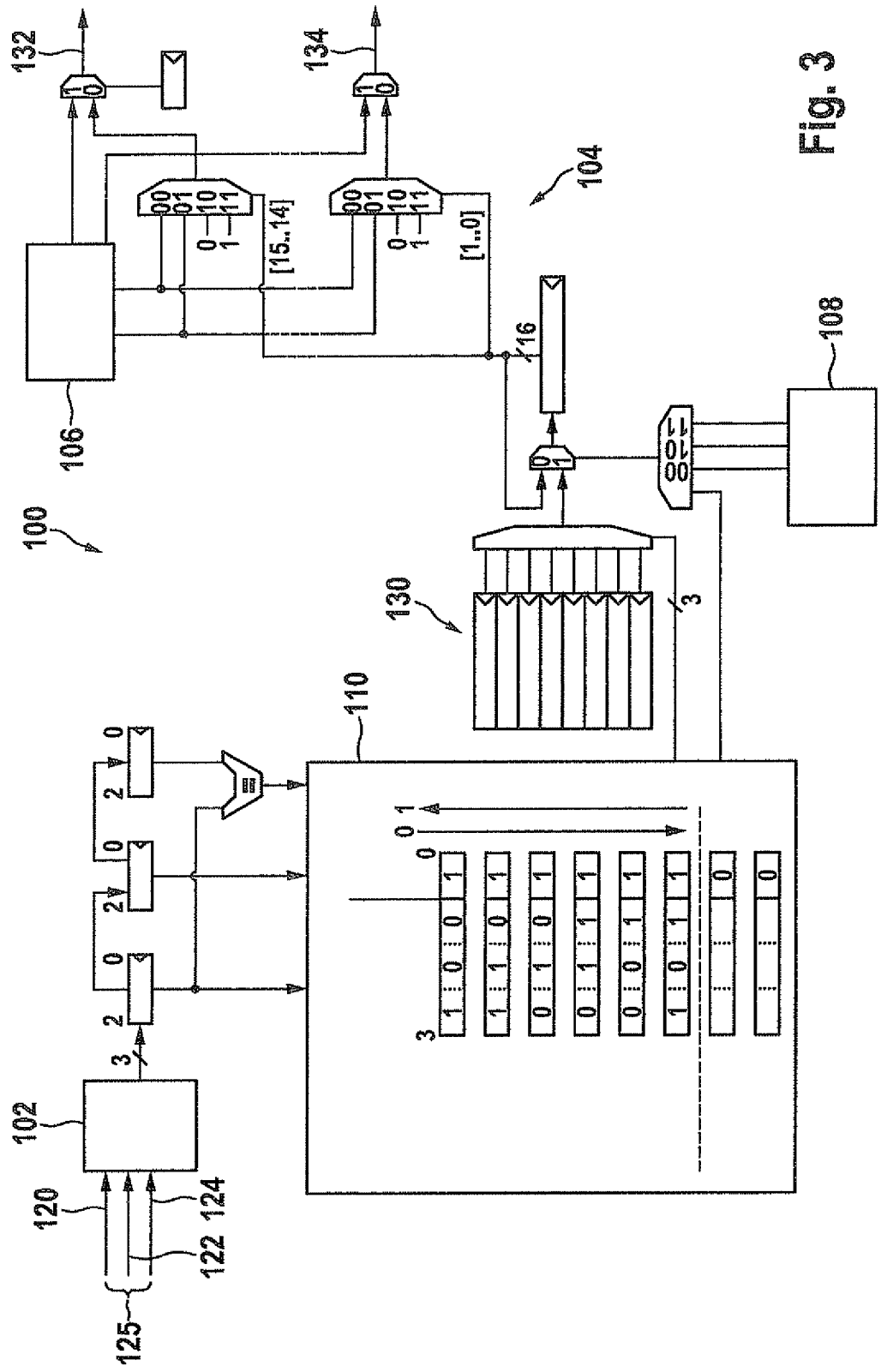
FIG. 3 shows a specific embodiment of the described circuit configuration in a block diagram.

In a block diagram, FIG. 3 provides a specific embodiment of a described circuit configuration which is indicated as a whole by reference numeral 100. The circuit configuration includes a timer unit input module 102, a timer unit output module 104 having two PWM generators 106 and 108 and a signal evaluation module 110.

Three input signals 120, 122 and 124 are input into timer unit input module 102. These form input pattern 125. Together with a validity bit, these are passed into signal evaluation module 110. From this signal evaluation module 110, eight output patterns 130 may be output as a function of input pattern 125.

Timer unit output module 104, outputs eight output signals corresponding to selected output pattern 130, of which, in this illustration, first output signal 132 (channel 0) and eighth output signal 134 (channel 7) are shown.

Input signals 120, 122 and 124 at timer unit input module 102 come from a BLOC motor and show the current motor position. Typically, three sensor signals are involved. The input pattern or signal pattern 125, which is expected at the inputs, had been stored previously by the software in signal evaluation module 110. A freely configurable output pattern 130 is linked to each input pattern 125. Output patterns 130 are stored in signal evaluation module 110, and are able to be changed by the software at any time. Consequently, it is possible to switch over the motor operation during the running time.

As a function of input pattern 125, either directly after a new pattern is detected, the corresponding output pattern is switched to the outputs of timer unit output module 104, or in a delayed manner, synchronously, for example, to a side of the output signal. Up to eight input patterns and output patterns are able to be configured. The PWM for a phase is always generated on the same PWM generator (channel 0 of timer unit output module 104) and then as a function of programmed output pattern 130 is switched to the appropriate outputs.

In order to avoid the creation of short switching pulses at the switchover moment, the switching over is able to take place either synchronously to the PWM or triggered via an additional PWM channel (channel 2 of timer unit output module 104). It is freely optional which trigger to use, since this is a function of the motor parameters, such as the rotational speed or the type of motor.

If a new input pattern 125 is detected, signal evaluation module 110 reports the corresponding rotational direction of the motor. If an input pattern 125 is detected which is not programmed, or an input pattern 125 is skipped, signal evaluation module 110 signals this to the CPU using an interrupt.

If the position detection takes place without sensors (back-EMF), an evaluation component is necessary. However, the evaluation component does not signal the commutation change (such as the Hall sensors) but the zero crossing of the back-EMF voltage. This zero crossing is 30° (electric angle) earlier than the next commutation. For this reason, it is necessary in this method to delay the commutation by 30°.

If signal evaluation module 110 detects new input patterns 125, channel 2 of timer unit output module 104 is triggered, using a so-called NIPD signal.

Channel 2 of timer unit output module 104 outputs a pulse (oneshot) and thus triggers the next commutation.

The CPU has to calculate the 30° delay and write it into channel 2 of timer unit output module 104.

The PWM, which is always present at one of the outputs, is produced in channel 0 of timer unit output module 104. At channel 1 of timer unit output module 104, an inverted PWM signal may additionally be generated in order, for example, to activate high switch and low switch (e.g. HU+Lu) at the same time. This function is required in some motor operating types. In this instance, HU+LU must never be switched on simultaneously. In order to obtain a sure delay time, the trigger mechanism that is present in the channel of timer unit output module 104 may be used.

Signal evaluation module 110, timer unit input module 102 and timer unit output module 104 generate 3-phase alternating voltage for the BLDC driving. As a function of an output stage driver, the output signals have to be output to three or six timer unit outputs. The output of the signals is a function of the input pattern which is returned by the motor. Two of the three phases for the driving are usually connected statically, and the third phase outputs a PWM signal and thereby determines the torque.

What is claimed is:

1. A method for driving an electric motor, the method comprising:
    storing at least one expected input pattern in a signal evaluation module;
    providing input signals at a timer unit input module, the input signals coming from the electric motor and correspond to a current motor position, wherein the input signals form an input pattern;
    providing a freely configurable output pattern that is linked to each of the input patterns, wherein the output patterns are stored in the signal evaluation module;
    switching, as a function of an input pattern, either directly after a new pattern is detected or in a delayed manner, a corresponding output pattern to outputs of a timer unit output module, so that a plurality of input patterns and output patterns are configurable, so as to provide a selected output pattern; and
    driving the electric motor by the selected output pattern.

2. The method as recited in claim 1, wherein the electric motor is a brushless DC motor.

3. The method as recited in claim 2, wherein the output pattern includes at least one pulse width modulation signal.

4. The method as recited in claim 3, wherein the input pattern is generated by the electric motor.

5. The method as recited in claim 3, wherein association of input patterns to the stored output patterns is variable depending on different operating modes of the electric motor.

6. The method as recited in claim 5, wherein the selected output pattern is output directly after a new pattern is detected.

7. The method as recited in claim 5, wherein the selected output pattern is output with a delay.

8. The method as recited in claim 7, wherein a switchover between different output patterns takes place in a triggered manner.

9. A circuit configuration for driving an electric motor, comprising:
    a timer unit input module to record and filter input signals, representing an input pattern;
    a timer unit output module to output signals, representing an output pattern, via a plurality of output channels; and
    a signal evaluation module storing a plurality of output patterns for driving the electric motor, wherein the stored output patterns are associated with specified input patterns such that a selected one of the stored output patterns is output as a function of a specified input pattern, wherein the electric motor is driven by the selected output pattern.

10. The circuit configuration as recited in claim 9, wherein the circuit configuration provides at least one pulse width modulation (PWM) signal in the output pattern.

11. The circuit configuration as recited in claim 9, wherein the timer unit output module includes at least one PWM generator.

12. The circuit configuration as recited in claim 9, wherein the input signals at the timer unit input module come from a brushless DC (BLDC) motor and provide a current motor position.

13. The circuit configuration as recited in claim 9, wherein a time at which a new driving pattern is applied can occur one of: (i) synchronously to changes of the input signals, and (ii) asynchronously to the input signals, but synchronously to events at the output signals.

14. The circuit configuration as recited in claim 9, wherein a time at which a new driving pattern is applied can occur one of: (i) synchronously to changes of the input signals, and (ii) asynchronously to the input signals, but synchronously to events at the output signals, the events including a rising or falling side at the output, and wherein commutating of the next task is performed synchronously with the input signal.

15. The circuit configuration as recited in claim 9, wherein the output patterns are stored in a table in the signal evaluation module.

16. The circuit configuration as recited in claim 9, wherein to avoid short switching pulses at a switchover moment, the switching over occurs either synchronously to the PWM or is triggered via an additional PWM channel.

17. The circuit configuration as recited in claim 9, wherein if a new input pattern is detected, the signal evaluation module reports a corresponding rotational direction of the motor, and if an input pattern is detected which is not programmed or an input pattern is skipped, the signal evaluation module signals a CPU using an interrupt.

18. The circuit configuration as recited in claim 9, wherein if the position detection occurs without sensors, an evaluation component signals the zero crossing of a back-EMF voltage, and wherein the zero crossing is 30° (electric angle) earlier than a next commutation, and the commutation is delayed by 30°.

19. A device for driving an electric motor, comprising:
   a storing arrangement to store at least one expected input pattern in a signal evaluation module;
   a providing arrangement to provide input signals at a timer unit input module, the input signals coming from the electric motor and correspond to a current motor position, wherein the input signals form an input pattern, and to provide a freely configurable output pattern that is linked to each of the input patterns, wherein the output patterns are stored in the signal evaluation module;
   a switching arrangement to switch, as a function of an input pattern, either directly after a new pattern is detected or in a delayed manner, a corresponding output pattern to outputs of a timer unit output module, so that a plurality of input patterns and output patterns are configurable, so as to provide a selected output pattern; and
   a driving arrangement to drive the electric motor by the selected output pattern.

\* \* \* \* \*